(12) United States Patent
Kim

(10) Patent No.: US 9,172,323 B2
(45) Date of Patent: Oct. 27, 2015

(54) POWER SAVING DRIVING CIRCUIT INCLUDING POWER FACTOR CORRECTION FOR AN INDUCTION MOTOR

(71) Applicant: Young Jun Kim, Seoul (KR)

(72) Inventor: Young Jun Kim, Seoul (KR)

( * ) Notice: Subject to any disclaimer, the term of this patent is extended or adjusted under 35 U.S.C. 154(b) by 160 days.

(21) Appl. No.: 14/104,779

(22) Filed: Dec. 12, 2013

(65) Prior Publication Data

US 2014/0167673 A1 Jun. 19, 2014

(30) Foreign Application Priority Data

Dec. 13, 2012 (KR) ........................ 10-2012-0145378

(51) Int. Cl.
| | |
|---|---|
| *H02P 1/24* | (2006.01) |
| *H02P 25/04* | (2006.01) |
| *H02P 7/29* | (2006.01) |
| *H02P 23/00* | (2006.01) |

(52) U.S. Cl.
CPC .............. *H02P 25/04* (2013.01); *H02P 7/2913* (2013.01); *H02P 23/0081* (2013.01)

(58) Field of Classification Search
CPC .. H02P 23/0081; H02P 25/04; H02M 1/4208; H02M 1/4233
See application file for complete search history.

(56) References Cited

U.S. PATENT DOCUMENTS

2015/0022164 A1* 1/2015 Ye et al. .................. 323/210

FOREIGN PATENT DOCUMENTS

| KR | 20-0354200 Y1 | 6/2004 |
|---|---|---|
| KR | 1020050117125 A | 12/2005 |

* cited by examiner

*Primary Examiner* — Karen Masih
(74) *Attorney, Agent, or Firm* — Kaplan Breyer Schwarz & Ottesen, LLP

(57) ABSTRACT

A power saving driving circuit for a motor including power factor correction comprises an induction motor; a power factor correction capacitor; a first switching element allowing the motor to operate in a positive sine wave period of an power supply voltage; a diode allowing the power factor correction capacitor to be charged during the first switching element being OFF; a second switching element allowing the motor to operate in a negative sine wave period of the power supply voltage; another diode allowing the power factor capacitor to be charged during the second switching element being OFF; a third switching element connected in parallel to the diode; a fourth switching element connected in parallel to the other diode; and a controller controlling the motor to save power by controlling the third and fourth switching elements when a charged voltage in the power factor correction capacitor reaches a predetermined set value.

6 Claims, 14 Drawing Sheets

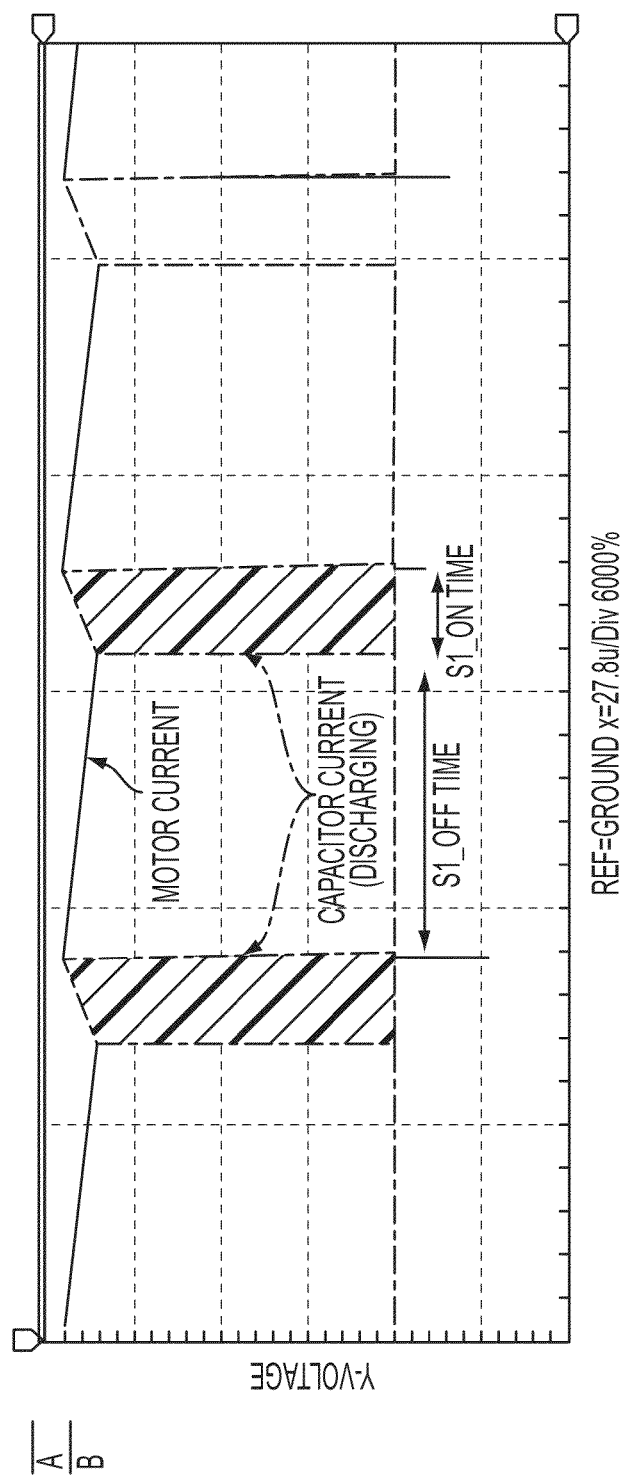

POWER SAVING DRIVING CIRCUIT INCLUDING POWER FACTOR CORRECTION FOR AN INDUCTION MOTOR

CROSS-REFERENCE TO RELATED APPLICATION(S)

Korean Patent Application KR 10-2012-0145378 with a filing date of Dec. 13, 2012, is incorporated herein by reference.

BACKGROUND OF THE INVENTION

1. Field of the Invention

The present invention relates to a motor driving circuit, and more particularly, to a power saving driving circuit including power factor correction for an AC motor, capable of saving power by charging a power factor correction capacitor with a flyback voltage accumulated in a coil of the motor in normal operation mode and operating the motor with a discharge voltage of the capacitor in a power saving mode.

2. Description of the Related Art

Typically, an AC drive control technology has limitation in distribution due to a high design cost and circuit complexity despite of persistent development thereof. In particular, an inverter noise, such as harmonics or high frequencies, is usually a critical issue of an inductive circuit control using switching elements for a long time.

FIG. 1 illustrates a typical motor driving circuit. The typical motor driving circuit includes a converter 12 converting an AC power supply voltage into a DC power supply voltage, an inverter 14 receiving the DC power supply voltage from the converter 12 and driving the motor 20 according to a control signal from a controller 16, an encoder 22 detecting a rotation speed of the motor 20, and the controller 16. The motor 20 is an AC motor and various documents are published regarding to a control of the rotation speed for the motor.

However, such a typical motor driving circuit has limitations in that power consumption in an internal circuit is high and production costs are high due to complexity of voltage & frequency (VF) control using a pulse width modulation (PWM) signal. In particular, preparations of a converter for AC-to-DC-converting, an inverter for DC-to-AC-inverting, and an electromagnetic interference (EMI) filter circuit including a power factor correction (PFC) circuit for limiting harmonics/high frequencies cause an entire cost increase together with a cost according to complexity of the speed control using the PWM signal. In addition, due to use of a separate inductor, a typical PFC circuit causes a cost increase and is susceptible to component damage due to an instant current change (di/dt) or an impulse current generation in a switch ON state.

Furthermore, a phase control scheme, which is mainly used in speed control of a cheap AC motor, is a chopped AC scheme for modulating a motor applied voltage waveform by directly using a triode for AC (TRIAC) without the converter/inverter circuit, and is a scheme for controlling a rotation speed by increasing slip of a motor. According to the scheme, a circuit configuration is simple, design thereof is relatively easy, and power consumption of the internal control circuit is low. However, a speed control is not precise and it is difficult to correct a power factor because of instability of a current waveform according to motor characteristics appeared during the voltage phase control.

Patent literature 1: Korean patent No. KR20-0354200 Y1
Patent literature 2: Korean patent No. KR10-0583189 B1

SUMMARY OF THE INVENTION

Accordingly, the present invention is directed to a power saving driving circuit for a motor including power factor correction that substantially obviates one or more problems due to limitations and disadvantages of the related art, wherein the power saving driving circuit may save a cost without using a converter and an inverter and save power by using a motor coil as a power factor correcting inductor, charging a power factor correction capacitor with a flyback voltage accumulated in a coil of the motor in normal operation mode, and operating a motor with a discharge voltage of the capacitor in a power saving mode.

According to an embodiment of the present invention, a power saving driving circuit is provided to realize a speed control circuit by means of a reference voltage and current reduction by replacing a separate inductor used for correcting a power factor with a motor coil, achieving power saving by discharging a voltage charged in a power factor correction capacitor through a feedback circuit, and detecting a motor applied voltage waveform through a simple resistance dividing circuit to apply a sine wave current to the motor.

In detail, according to an embodiment of the present invention, a power saving driving circuit for a motor including power factor correction, includes: a motor; a power factor correction capacitor; a first switching element allowing the motor to operate in a positive sine wave period of an power supply voltage; a diode allowing the power factor correction capacitor to be charged during the first switching element being OFF; a second switching element allowing the motor to operate in a negative sine wave period of the power supply voltage; another diode allowing the power factor capacitor to be charged during the second switching element being OFF; a third switching element connected in parallel to the diode and allowing the motor to operate in a power saving mode with a discharge current of the power factor correction capacitor in the positive period of the power supply voltage; a fourth switching element connected in parallel to the other diode and allowing the motor to be operate in a power saving mode with a discharge current of the power factor correction capacitor in the negative period of the power supply voltage; and a controller controlling the motor to save power by controlling the third and fourth switching elements when a charged voltage in the power factor correction capacitor reaches a predetermined set value while the motor is normally operated by controlling the first and second switching elements.

The controller may include a microcomputer receiving a phase detecting signal of the power supply voltage and a detecting signal of the charged capacitor voltage and outputting enable signals for turning on the first to fourth switching elements; a normal operation detecting resistor allowing an operation current of the motor to be detected during a normal operation mode; a power saving operation detecting resistor allowing an operation current of the motor to be detected during a power saving mode; a first operational amplifier amplifying a detection voltage across the normal operation detecting resistor; a second operational amplifier amplifying a detection voltage across the power saving operation detecting resistor; a multiplexer selecting an output of the first or second operational amplifier according to a selection signal; a first switching element controller comparing an output of the multiplexer with an input voltage sine wave to output a control signal for turning on/off the first switching element; a second switching element controller comparing an output of the multiplexer with an input voltage sine wave to output a control signal for turning on/off the second switching element; a third switching element controller comparing a capacitor voltage with an input voltage peak in the power saving operation to output a control signal for turning on/off the third switching element; and a fourth switching element controller comparing a capacitor voltage with an input voltage peak in the power saving operation to output a control signal for turning on/off the fourth switching element.

BRIEF DESCRIPTION OF THE DRAWINGS

FIG. 14 is an enlarged waveform diagram illustrating a portion of the waveform of FIG. 13.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
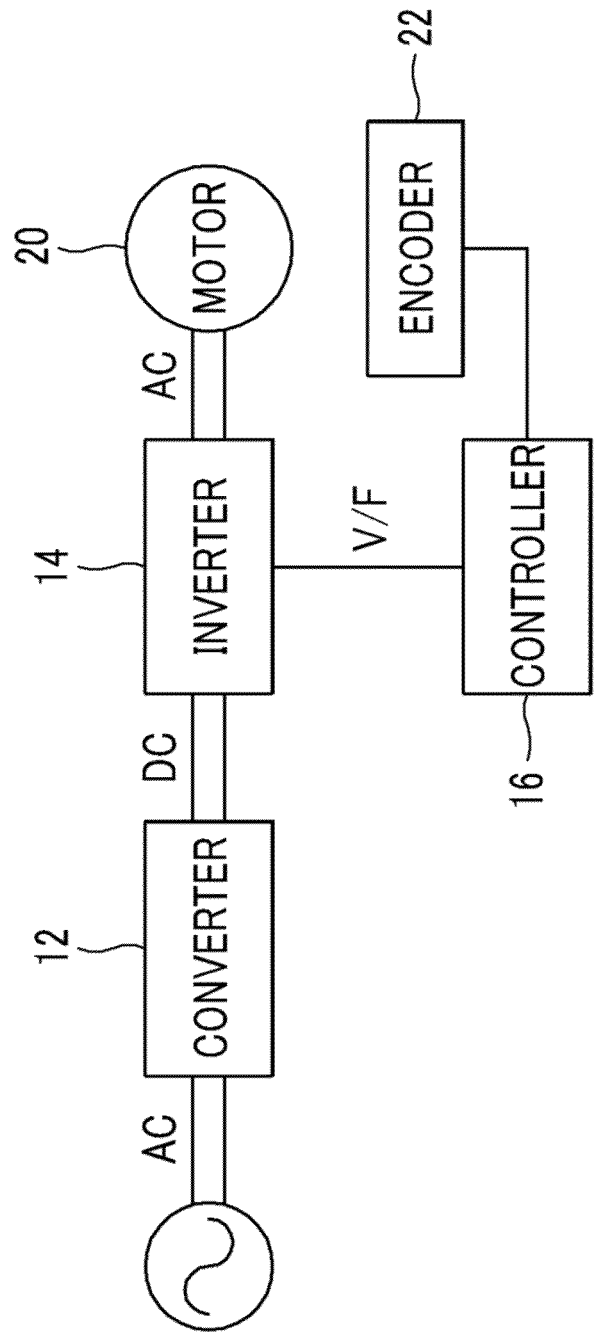
FIG. 1 is a schematic diagram illustrating a typical motor driving circuit.
Figure 2:
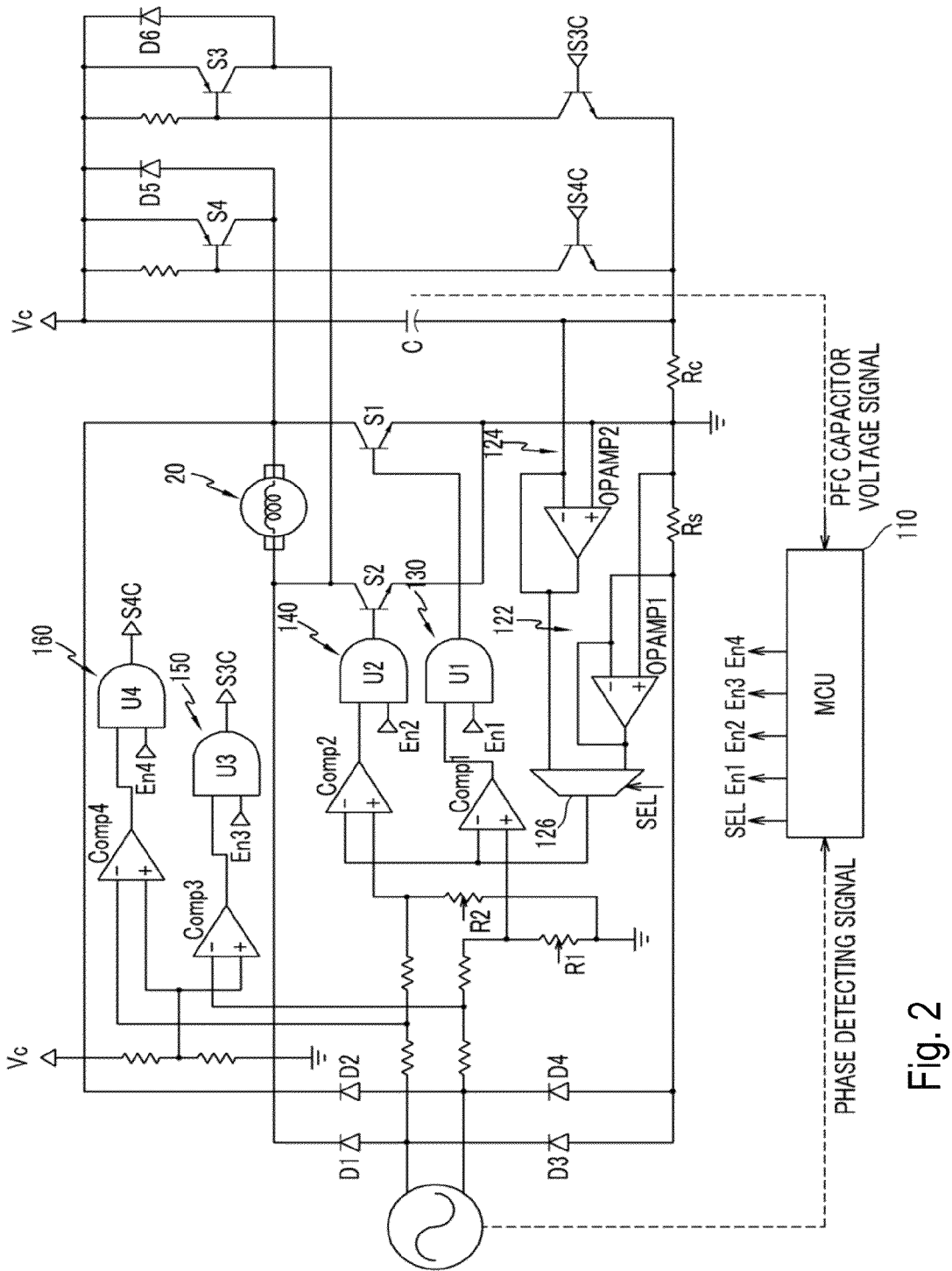
FIG. 2 is a circuit diagram illustrating a power saving driving circuit for a motor including power factor correction.
Figure 3:
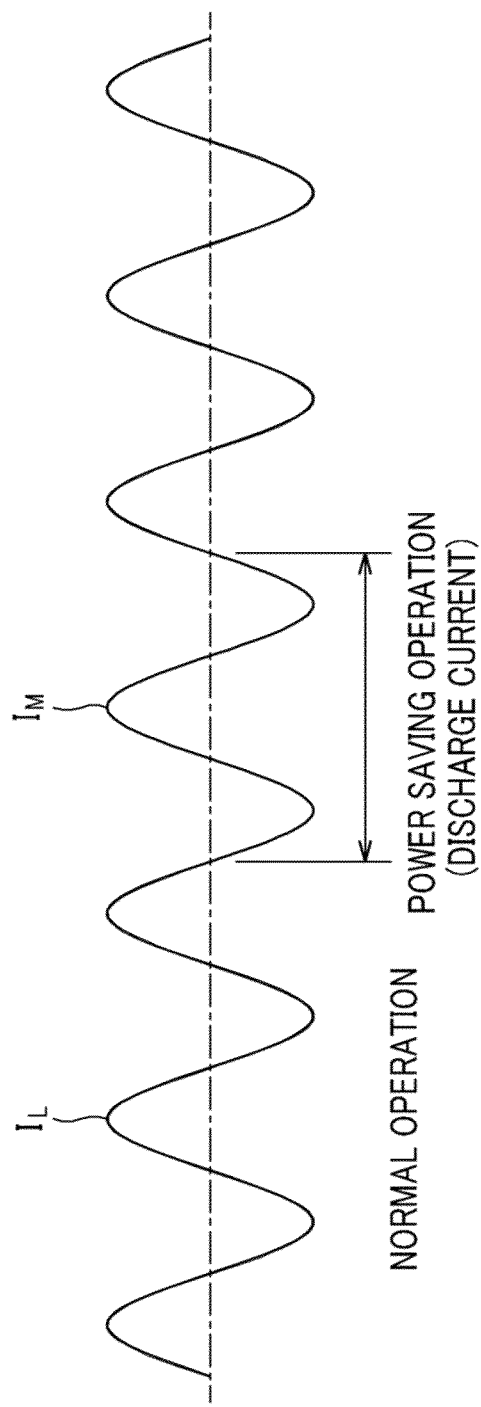
FIG. 3 is waveform diagram illustrating an operation current of a power saving driving circuit for a motor according to an embodiment of the present invention.

FIG. 2 is a circuit diagram illustrating a power saving driving circuit for a motor including power factor correction according to an embodiment of the present invention, and FIG. 3 is a waveform diagram illustrating an operation current of the motor driving circuit according to an embodiment of the present invention.

The power saving circuit for a motor including power factor correction includes, as shown in FIG. 2, a motor 20, a power factor correction capacitor C, a first switching element S1 for operating the motor 20 in a period of a positive sine wave of an input power, a diode D5 for charging the power factor correction capacitor C when the first switching element is turned off, a second switching element S2 for operating the motor 20 in a period of a negative sine wave of the input power, a diode D6 for charging the power factor correction capacitor C when the second switching element S2 is turned off, a third switching element S3 for operating the motor 20 with a discharge current of the capacitor C in a positive period of the input power in a power saving mode, a fourth switching element S4 for operating the motor 20 with a discharge current of the capacitor C in a negative period of the input power in the power saving mode, and a controller controlling the third and fourth switching elements S3 and S4 so that the motor 20 operates to save power, when a charged voltage of the capacitor C reaches a preset value during operation of the motor 20 being in a normal operation mode by controlling the first and second switching elements S1 and S2.

The controller includes a microcomputer 110 for receiving a phase detecting signal of an power supply, a detecting signal for a charged voltage, and a manipulation signal, and outputting a selection signal SEL and enable signals En1 to En4 for turning on the first to fourth switching elements S1 to S4, a normal operation detecting resistor Rs for detecting an operation current of the motor 20 during a normal operation, a power saving operation detecting resistor Rc for detecting an operation current of the motor 20 during a power saving operation, a first operational amplifier OPAMP1 for amplifying the detected voltage across the normal operation detecting resistor Rs, a second operational amplifier OPAMP2 for amplifying the detected voltage across the power saving operation detecting resistor Rc, a multiplexer (MUX) 126 for selecting one of outputs from the first and second operational amplifiers OPAMP1 and OPAMP2 according to the selection signal SEL, a first switching element controller 130 for comparing an output of the MUX 126 and an input voltage sine wave to output a control signal for turning on/off the first switching element S1, a second switching element controller 140 for comparing an output of the MUX 126 and the input voltage sine wave to output a control signal for turning on/off the second switching element S2, a third switching element controller 150 for comparing a charged voltage in the power saving mode with the input voltage peak to output a control signal for turning on/off the third switching element 150, and a fourth switching element controller 160 for comparing the charged voltage in the power saving mode with the input voltage peak to output a control signal for turning on/off the fourth switching element 160.

Referring to FIG. 2, the first switching element controller 130 includes a first comparator Comp1 for comparing an output from the first operational amplifier OPAMP1 of MUX 126 with an input voltage sine wave to output a logic high signal or a logic low signal, and a first AND gate U1 for a logical product operation of an output of the first comparator Comp1 and a first enable signal En1 of the microcomputer 110 to turn on/off the first switching element S1. The second switching element controller 140 includes a second comparator Comp2 comparing an output of the first operational amplifier OPAMP1 from MUX 126 with an input voltage sine wave to output a logic high signal or a logic low signal, and a second AND gate U2 for a logical product operation of an output of the second comparator Comp2 and a second enable signal En2 of the microcomputer 110 to turn on/off the second switching element S2.

The third switching element controller 150 includes a third comparator Comp3 for comparing a divided charged voltage Vc of the capacitor C and a divided input voltage peak to output a logic high signal or a logic low signal, and a third AND gate U3 for a logical product operation of an output of the third comparator Comp3 and a third enable signal En3 of the microcomputer 110 to turn on/off the third switching element S3. The fourth switching element controller 160 includes a fourth comparator Comp4 for comparing a divided charged voltage Vc of the capacitor C and a divided input voltage peak to output a logic high signal or a logic low signal, and a fourth AND gate U4 for a logical product operation of an output of the fourth comparator Comp4 and a fourth enable signal En4 of the microcomputer 110 to turn on/off the fourth switching element S4.

The power saving driving circuit for a motor having the above described configuration according to an embodiment of the present invention, as shown in FIG. 3, has an effect for reducing power by charging a power factor correction capacitor with a flyback voltage accumulated in a coil of the motor 20, when the switching elements are turned off in the normal operation mode, and operating the motor 20 with the discharge voltage of the capacitor C in a power saving mode, when a charged voltage in the power factor correction capacitor C reaches a preset value. Referring to FIG. 3, it can be known that input power is saved by driving the motor 20 with the discharge current of the capacitor C in the power saving mode.

Furthermore, operations of the power saving circuit for a motor having the above described configuration according to an embodiment of the present invention are described in relation to operation current flows shown in FIGS. 4 to 9.

Firstly, Table 1 shows an entire operation of a power saving driving motor for a motor according to an embodiment of the present invention.

Referring to FIG. 2, when a input voltage is applied in a normal operation mode, a motor current is proportional to a voltage signal of the resistor Rs, and this voltage signal is input to (−) terminals of the first and second comparators Comp1 and Comp2 via the first operational amplifier OPAMP1. A (−) terminal signal of the first comparator Comp1 is compared with a voltage signal of a first variable resistor R1 in positive (+) state of the input voltage to control the first switching element S1, and compared with a voltage signal of a second variable resistor R2 in negative (−) state of the input voltage to control the second switching element S2.

Figure 4:
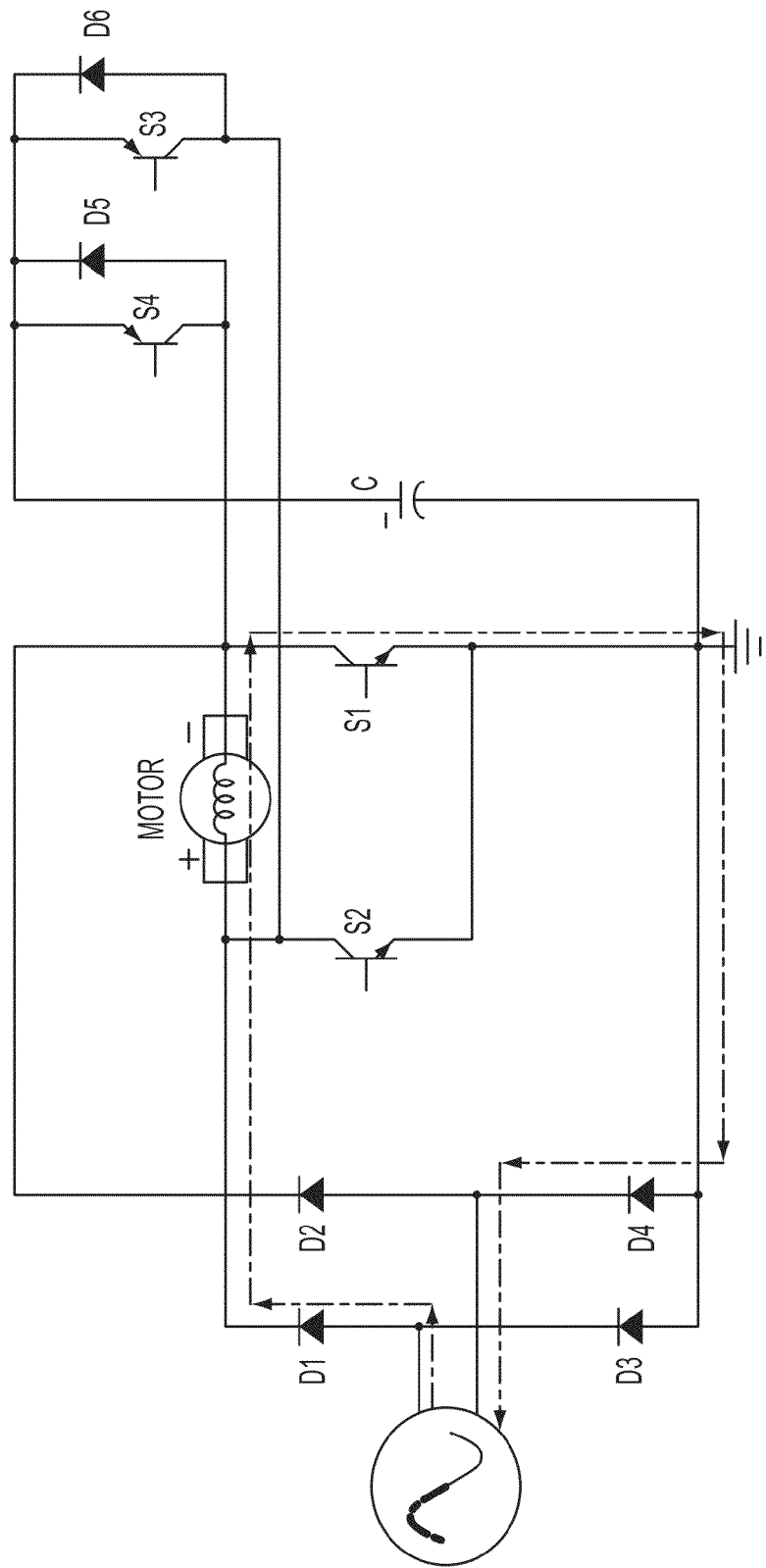
FIG. 4 illustrates a flow of a current according to a positive (+) sine wave input when a first switching element is turned on in a motor driving circuit according to an embodiment of the present invention.

As shown in Table 1, the microcomputer 110 allows En1 signal to be 1 and En2 to En4 signals to be 0. When a positive (+) period of a input voltage is applied in a state where an output of the first operational amplifier OPAMP1 is selected as the selection signal SEL of the MUX 126, an output signal of the first operational amplifier OPAMP1, which is input to the first comparator Comp1, is smaller than the R1 voltage signal. Then the first comparator Comp1 becomes a High state to turn on the first switching element S1, and accordingly, as shown in FIG. 4, a current flows through the diode D1→the motor 20→the first the switching element S1→the diode D4, and the motor 20 normally operates and accumulates energy in the motor coil with "+−".

Figure 5:
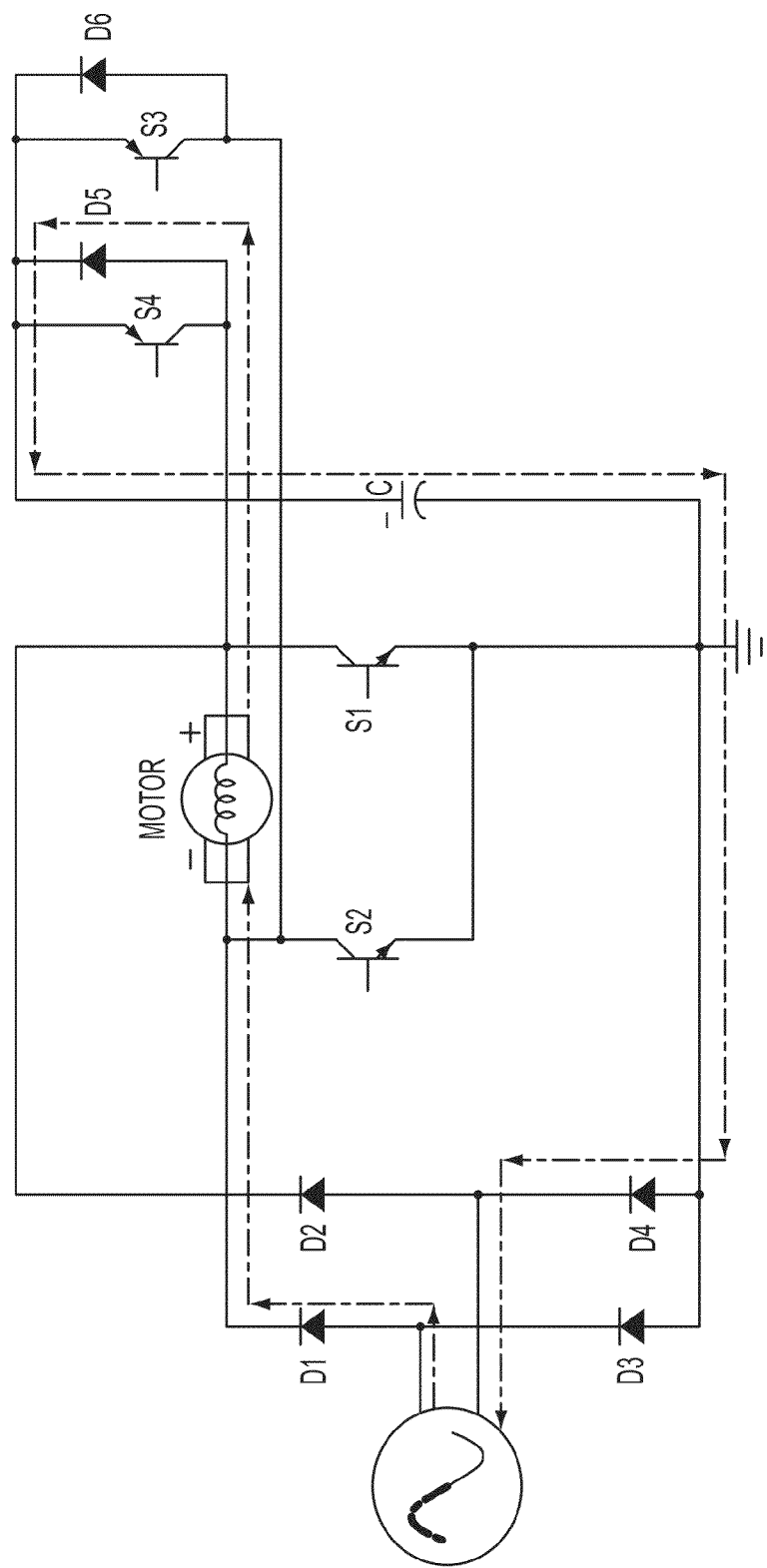
FIG. 5 illustrates a capacitor charging path when the first switching element is turned off in the motor driving circuit according to the embodiment of the present invention.

When the motor current increases and the output signal of the first operational amplifier OPAMP1 exceeds the R1 voltage signal, the first comparator Comp1 becomes to a Low state and the first switching element S1 becomes Off state. Accordingly, due to current maintaining characteristics of the motor coil, as shown in FIG. 5, flyback current flows through the diode D5 connected in parallel to the fourth switching element S4 to charge the power factor correction capacitor C. When coil energy decreases and the output signal from the operational amplifier OPAMP1 is smaller than the R1 voltage signal, the first comparator Comp1 becomes a High state again and the first switching element S1 becomes On state.

Figure 6:
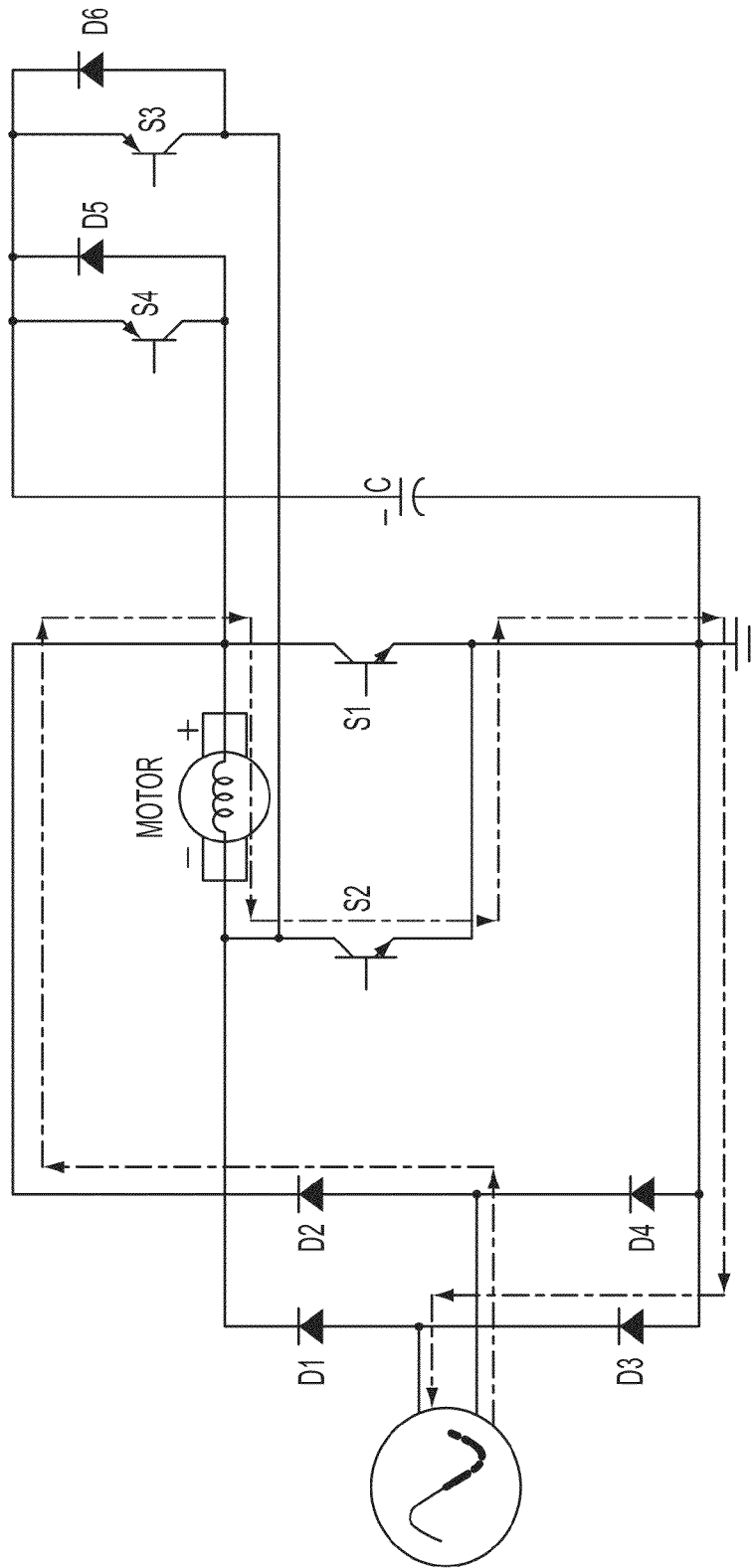
FIG. 6 illustrates a flow of a current according to a negative (−) sine wave input when a second switching element is turned on in a motor driving circuit according to an embodiment of the present invention.

As shown in Table 1, the microcomputer 110 allows En2 signal to be 1 and En1, En3, and En4 to be 0. When a negative (−) period a input voltage is applied in a state where an output of the first operational amplifier OPAMP1 is selected as the selection signal SEL of the MUX 126, an output signal of the first operational amplifier OPAMP1, which is input to the second comparator Comp2, is smaller than the R2 voltage signal. Then the second comparator Comp2 becomes a High state to turn on the second switching element S2, and accordingly, as shown in FIG. 6, a current flows through the diode D2→the motor 20→the second switching element S2→the diode D3, and the motor 20 normally operates and accumulates energy in the motor coil with "−+".

Figure 7:
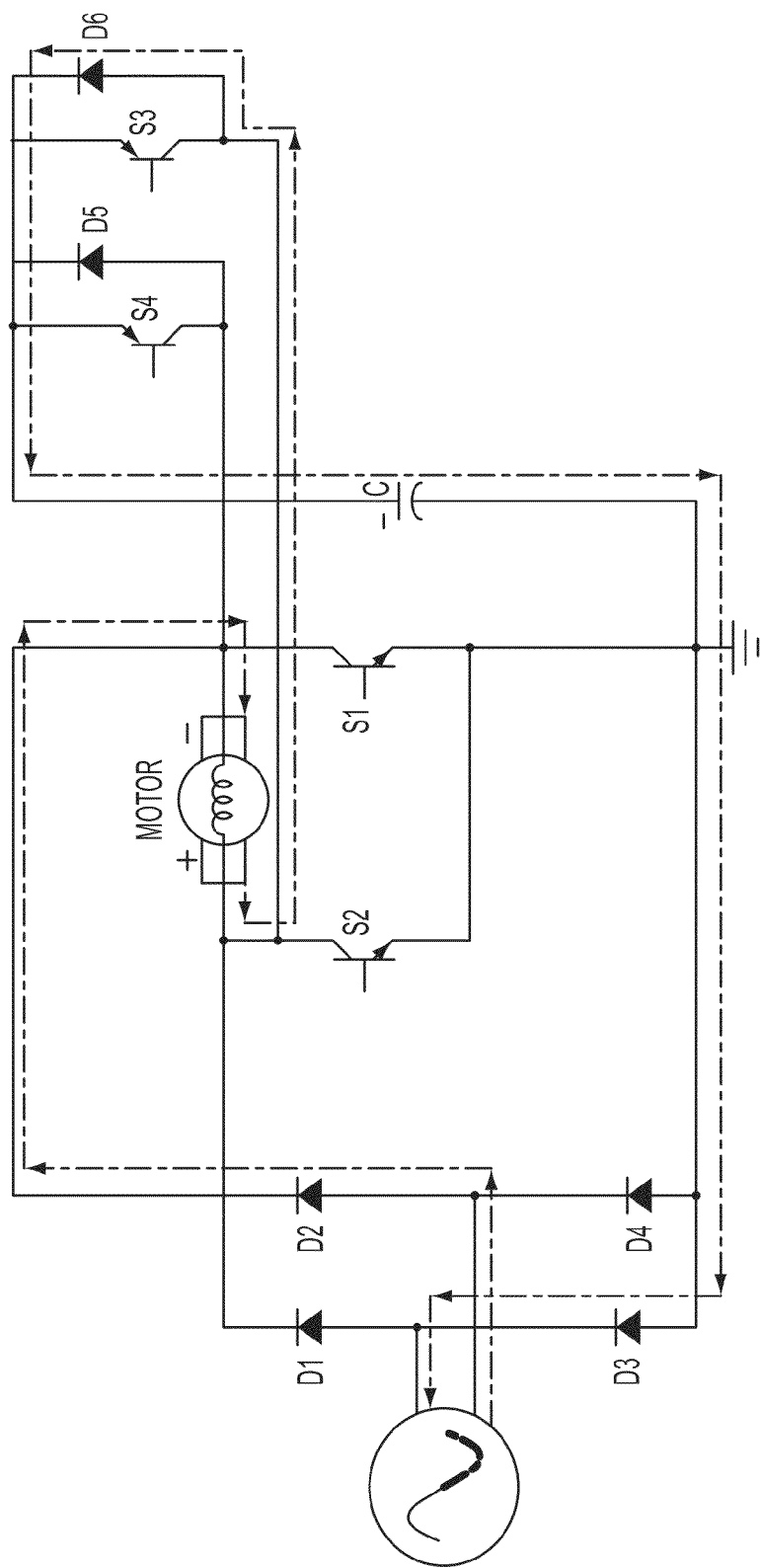
FIG. 7 illustrates a capacitor charging path when the first switching element is turned off in the motor driving circuit according to the embodiment of the present invention.

When the output signal of the first operational amplifier OPAMP1 exceeds the R2 voltage signal, the second comparator Comp2 becomes to a Low state and the second switching element S2 becomes Off state. Accordingly, due to current maintaining characteristics of the motor coil, as shown in FIG. 7, flyback current flows through the diode D6 connected in parallel to the third switching element S3 to charge the power factor correction capacitor C. When the output signal from the operational amplifier OPAMP1 is smaller than the R2 voltage signal, the second comparator Comp2 becomes a High state again and the second switching element S2 becomes On state.

Moreover, when the charge voltage Vc of the power factor correction capacitor C reaches approximately twice the input voltage Vs, the microcomputer 110 turns off the first and second switching elements S1 and S2, selects the output of the second operational amplifier OPAMP2 through the selection signal SEL, and controls the third and fourth switching elements S3 and S4 such that the motor 20 operates in the

TABLE 1

Figure 8:
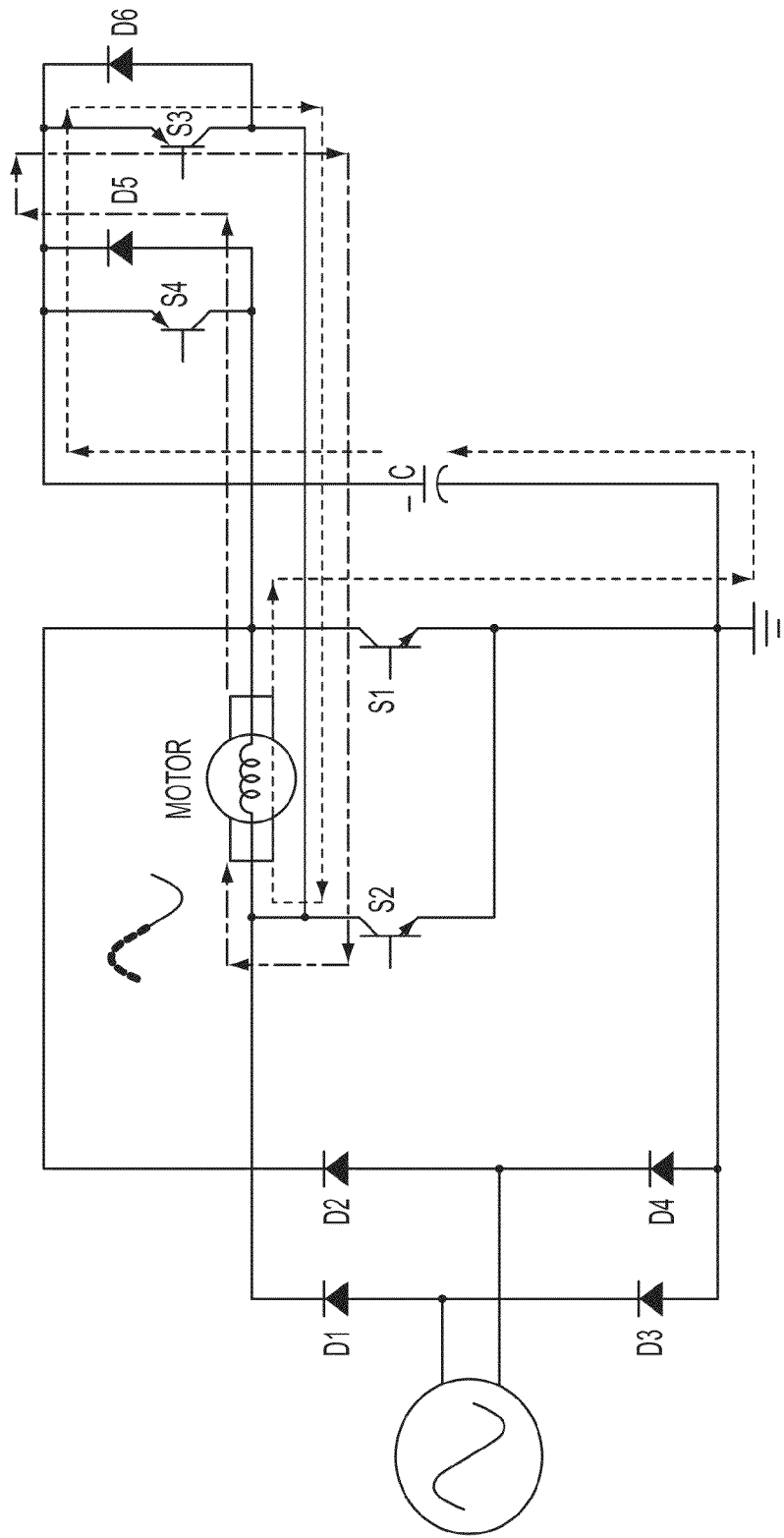
FIG. 8 illustrates a capacitor discharging path and a motor flyback current path in power saving mode for a half period of a positive (+) sine wave in a motor driving circuit according to an embodiment of the present invention.
Figure 9:
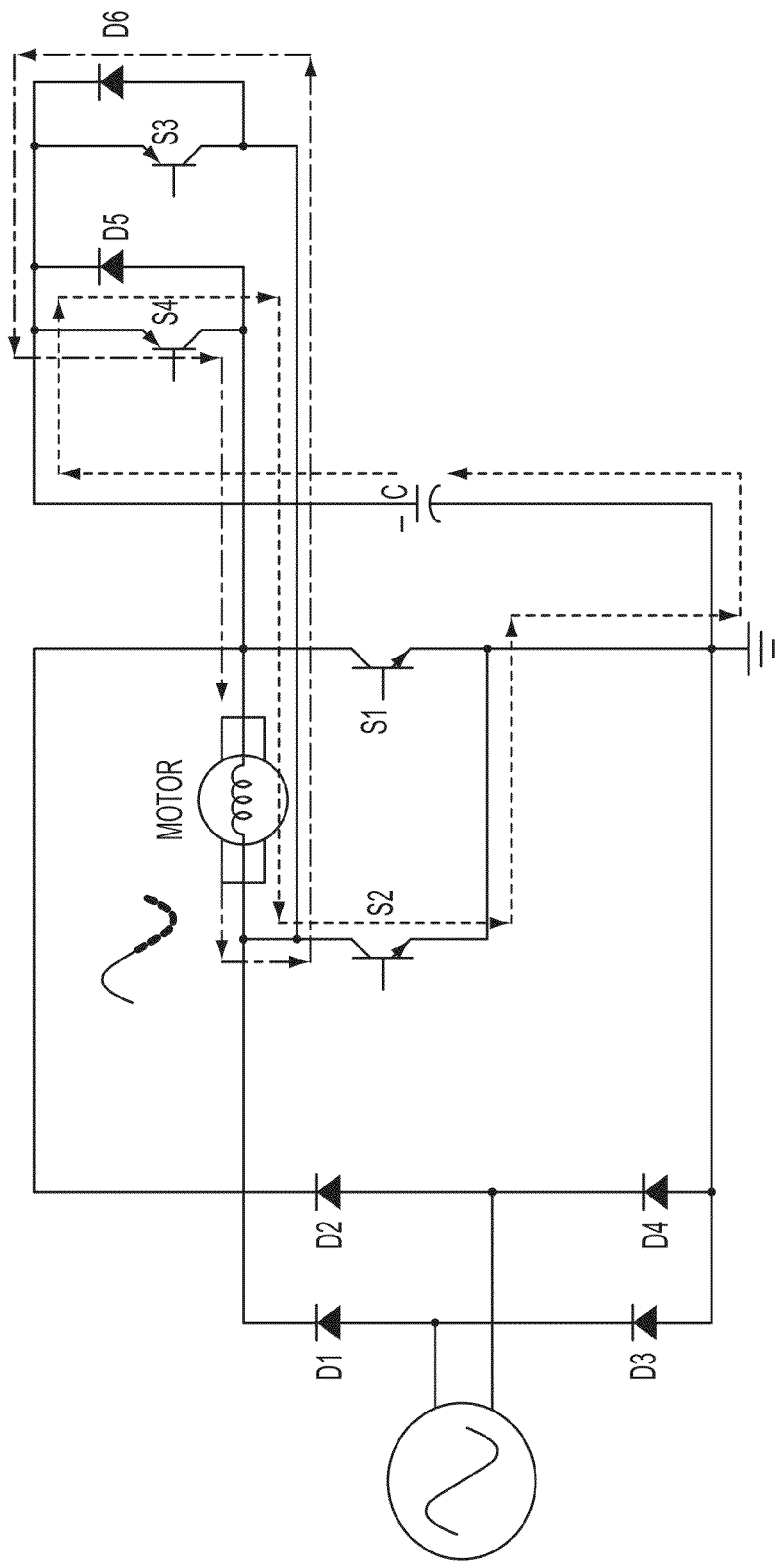
FIG. 9 illustrates a capacitor discharging path and a motor flyback current path in power saving mode for a half period of a negative (−) sine wave in a motor driving circuit according to an embodiment of the present invention.

| Related drawing | Input power | En1 | En2 | En3 | En4 | SEL | S1 | S2 | S3 | S4 | Capacitor | Motor operation |
|---|---|---|---|---|---|---|---|---|---|---|---|---|
| FIG. 4 | PI | 1 | 0 | 0 | 0 | OP1 | ON | OFF | OFF | OFF | — | N |
| FIG. 5 | PI | 0 | 0 | 0 | 0 | OP1 | OFF | OFF | OFF | OFF | C | N |
| FIG. 6 | NI | 0 | 1 | 0 | 0 | OP1 | OFF | ON | OFF | OFF | — | N |
| FIG. 7 | NI | 0 | 0 | 0 | 0 | OP1 | OFF | OFF | OFF | OFF | C | N |
| FIG. 8 | PI | 1 | 0 | 1 | 0 | OP2 | ON | OFF | ON | OFF | D | PS |
|  | PI | 0 | 0 | 1 | 0 | OP2 | OFF | OFF | ON | OFF | — | PS |
| FIG. 9 | NI | 0 | 1 | 0 | 1 | OP2 | OFF | ON | OFF | ON | D | PS |
|  | NI | 0 | 0 | 0 | 1 | OP2 | OFF | OFF | OFF | ON | — | PS |

(Here, PI: Positive Inversion, NI: Negative Inversion, C: Charge, D: Discharge, N: Normal operation, PS: Power saving operation)

power saving mode. That is, a method of increasing power saving effect in an embodiment of the present invention is to use the current maintaining characteristics of the motor coil, by storing a flyback current generated in an ON/OFF control of the motor current in an adjacent capacitor C, and applying the capacitor voltage Vc instead of the power supply voltage to the motor coil to save power, when the voltage Vc of the capacitor C is over a certain voltage or reaches twice Vs_peak. In this power saving operation mode, the capacitor voltage Vc is maintained larger than a peak value Vs_peak of the power supply voltage. That is, when a feedback circuit is configured by turning on the third and fourth switching elements S3 and S4 to apply a flyback current to the motor 20, a power saving effect can be increased.

When the positive (+) period of power supply voltage is applied in a state where the microcomputer 110 allows En1 signal and En3 signals to have 1 and En2 signal and En4 signal to have 0 as shown in Table 1, and the output of the second operational amplifier OPAMP2 is selected as the selection signal SEL of the MUX 126, the discharge current of the capacitor C flows through, as shown in FIG. 8, (+) side of the capacitor C→the third switching element S3→the motor 20→the first switching element S1→(−) side of the capacitor C, when the first switching element S1 becomes turned On. When the first switching element S1 becomes turned off, the flyback current is applied to the motor 20 by a closed circuit formed of the diode D5 connected in parallel to the fourth switching element S4 and the third switching element S3, and a current due to the power supply voltage Vs is blocked.

In addition, When the negative (−) period of power supply voltage is applied in a state where the microcomputer 110 allows En2 signal and En4 signals to have 1 and En1 signal and En3 signal to have 0 as shown in Table 1, and the output of the second operational amplifier OPAMP2 is selected as the selection signal SEL of the MUX 126, the discharge current of the capacitor C flows through, as shown in FIG. 9, (+) side of the capacitor C→the fourth switching element S4→the motor 20→the second switching element S2→(−) side of the capacitor C when the second switching element S2 becomes turned On. When the second switching element S2 becomes turned off, the flyback current is applied to the motor 20 by a closed circuit formed of the diode D6 connected in parallel to the third switching element S4 and the fourth switching element S4, and a current due to the applied power supply voltage Vs is blocked.

As described above, when the capacitor voltage Vc in the power saving mode is input to (+) terminals of the third and fourth comparators Comp3 and Comp4, and is greater than a power supply voltage for each phase input to (−) terminal by a predetermined value, the capacitor current is applied to the motor 20 and the power supply voltage current becomes limited by confirming zero-crossing points and giving the En3 or En4 signal to turn on the third and fourth switching elements S3 and S4.

Since the motor current is proportional to a voltage signal across Rc in the power saving mode, the input signal to (+) terminals of the first and second comparators Comp1 and Comp2 allows the output signal from the second operational comparator OPAMP2, which is an amplified signal of Rc voltage to be selected through the MUX 126. In positive (+) phase inversion state of the power supply voltage, the third switching element S3 becomes an On state. When the output signal of the second operational amplifier OPAMP2 exceeds a voltage signal across R1, the first comparator Comp1 becomes a High state to a Low state, the first switching element becomes Off state from On state, and a flyback current is applied through the diode D5 and the third switching element S3 due to current maintaining characteristics of the motor coil. At this time, like the power supply current control, when an Off state delay time is controlled through the En1 signal, the discharge current of the capacitor is reduced in proportion to the Off state delay time of the first switching element S1, thereby increasing energy efficiency.

On the contrary, in negative (−) phase inversion of the power supply voltage, when the fourth switching element S4 becomes On state and the output signal from the second operational amplifier OPAMP2 exceeds the voltage signal across R2, the second comparator Comp2 becomes a High state to a Low state and the second switching element S2 becomes Off state from On state. Then, the flyback current is applied through the diode D6 adjacent to the third switching element S3 and the fourth switching element S4 due to the current maintaining characteristics. Identically, variable Off state delay time of the second switching element S2 is controlled through the En2 signal according to motor characteristics to increase capacitor energy efficiency.

FIG. 4 illustrates a current path according to a positive (+) phase of input voltage during the first switching element S1 being in On state in a motor driving circuit according to an embodiment of the present invention, and FIG. 5 illustrates a charging path of the power factor correction capacitor C during the first switching element S1 being in Off state in a power saving driving circuit for a motor according to an embodiment of the present invention.

Referring to FIG. 4, in the positive (+) voltage inversion of the power supply, a motor current direction in On state of the first switching element S1 is the same as shown in a red arrow. At this time, a direction of a voltage Vm of the motor coil becomes opposite to that of the power supply voltage. In the positive (+) voltage inversion of the power supply, a direction of the motor current in Off state of the first switching element S1 is as shown in FIG. 5. Since the motor coil current has characteristics to maintain the current during Off state of the first switching element S1, flyback energy is charged in the capacitor C through the diode D5 connected in parallel to the fourth switching element S4. At this time, the coil voltage Vm of the motor 20 is instantly inverted in phase and added in series to the applied voltage Vs, thereby increasing the capacitor voltage Vc.

FIG. 6 illustrates a current path in a negative (−) phase of input voltage during the second switching element S2 being in On state in a motor driving circuit according to an embodiment of the present invention, and FIG. 7 illustrates a charging path of the capacitor C during the second switching element being in Off state in a power saving driving circuit of a motor according to an embodiment of the present invention.

Referring to FIG. 6, in the negative (−) voltage inversion of the power supply, a motor current direction in On state of the second switching element S2 is the same as shown in a red arrow. In the negative (−) voltage inversion of the power supply, a direction of the motor current in Off state of the second switching element S2 is as shown in FIG. 7. Since the motor coil current has characteristics to maintain the current in Off state of the second switching element S2, flyback energy is charged in the capacitor C through the diode D6 connected in parallel to the third switching element S3. At this time, the coil voltage Vm of the motor 20 is instantly inverted in phase and added in series to the applied voltage Vs, thereby increasing the capacitor voltage Vc.

FIG. 8 illustrates an current path in the power saving mode during the positive (+) voltage inversion in a motor power saving circuit according to an embodiment of the present invention, and FIG. 9 illustrates an operation path in the power saving mode during the negative (−) voltage inversion in a power saving driving circuit for a motor according to an embodiment of the present invention.

Referring to FIG. 8, when the first switching element is turned on, a charging current of the capacitor C flows through (+) side of the capacitor C→the third switching element S3→the motor 20→the first switching element S1→(−) side of the capacitor C, and, when the first switching element S1 is turned off, the flyback current of the motor 20 flows through a closed circuit formed of the diode D5, and the third switching element S3.

Referring to FIG. 9, when the second switching element is turned on, a charging current of the capacitor C flows through (+) side of the capacitor C→the fourth switching element S4→the motor 20→the second switching element S2→(−) side of the capacitor C, and, when the second switching element S2 is turned off, the flyback current of the motor 20 flows a closed circuit formed of the diode D6 and the fourth switching element S4.

Figure 10:
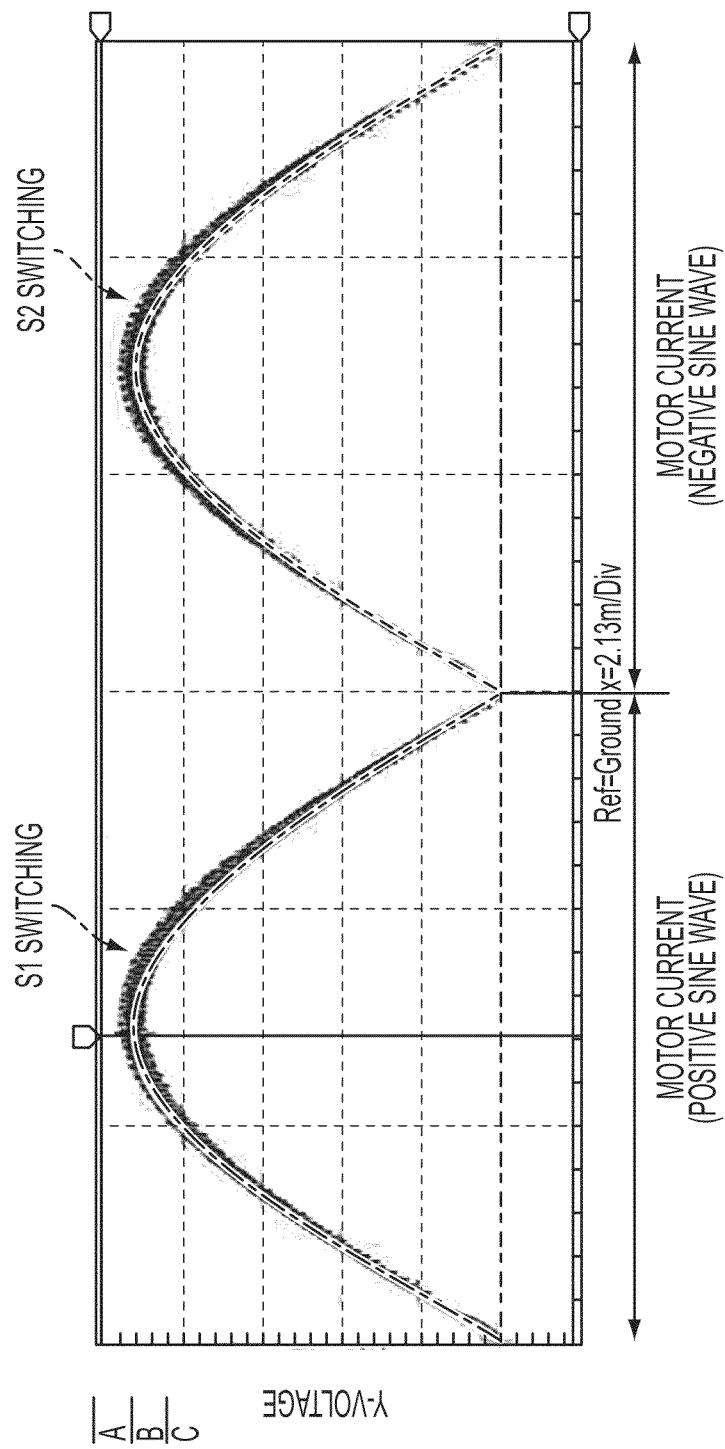
FIG. 10 is a waveform diagram illustrating a motor current in phase with an output of a first operational amplifier in a motor driving circuit according to an embodiment of the present invention.
Figure 11:
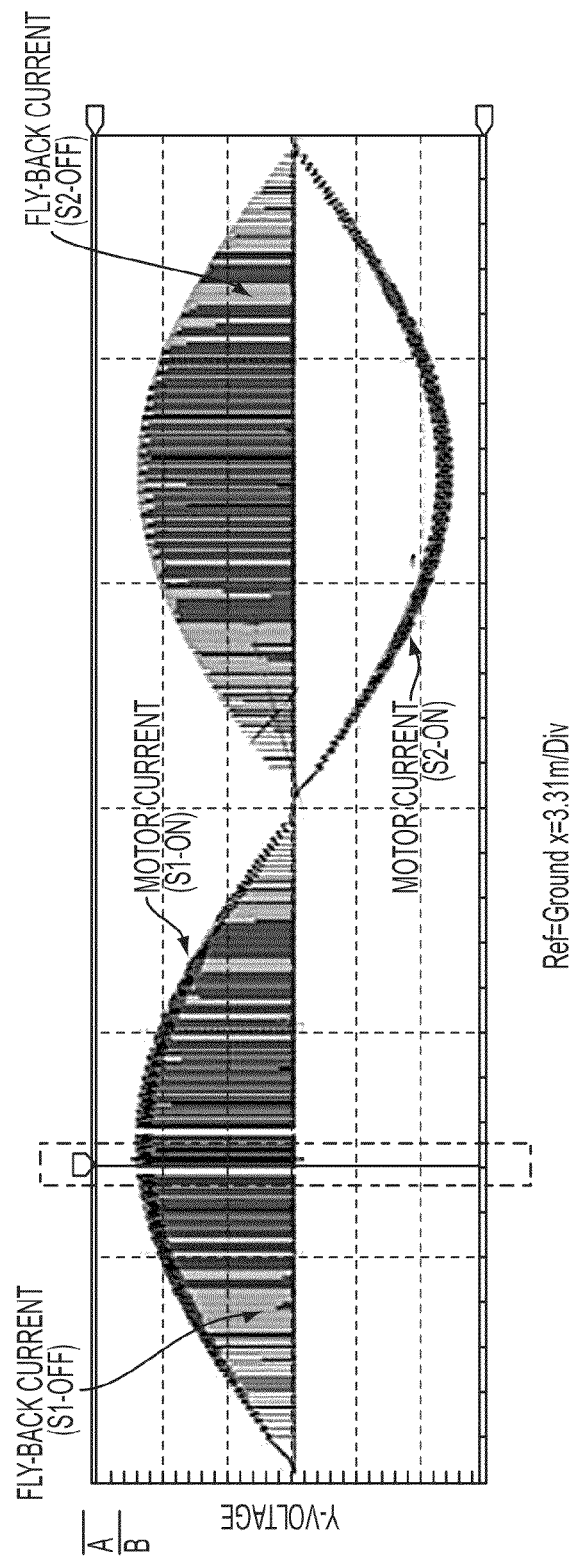
FIG. 11 illustrates a motor current and a capacitor charging current in a motor driving circuit according to an embodiment of the present invention.
Figure 12:
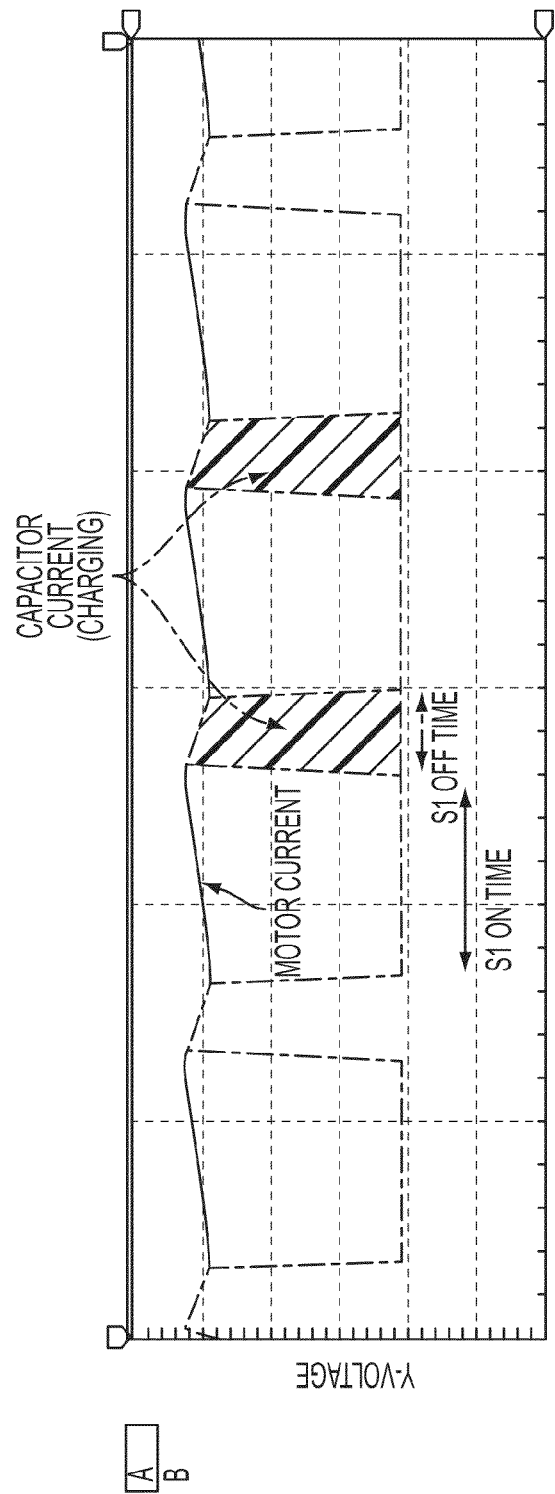
FIG. 12 is an enlarged waveform diagram illustrating a portion of the waveform of FIG. 11.
Figure 13:
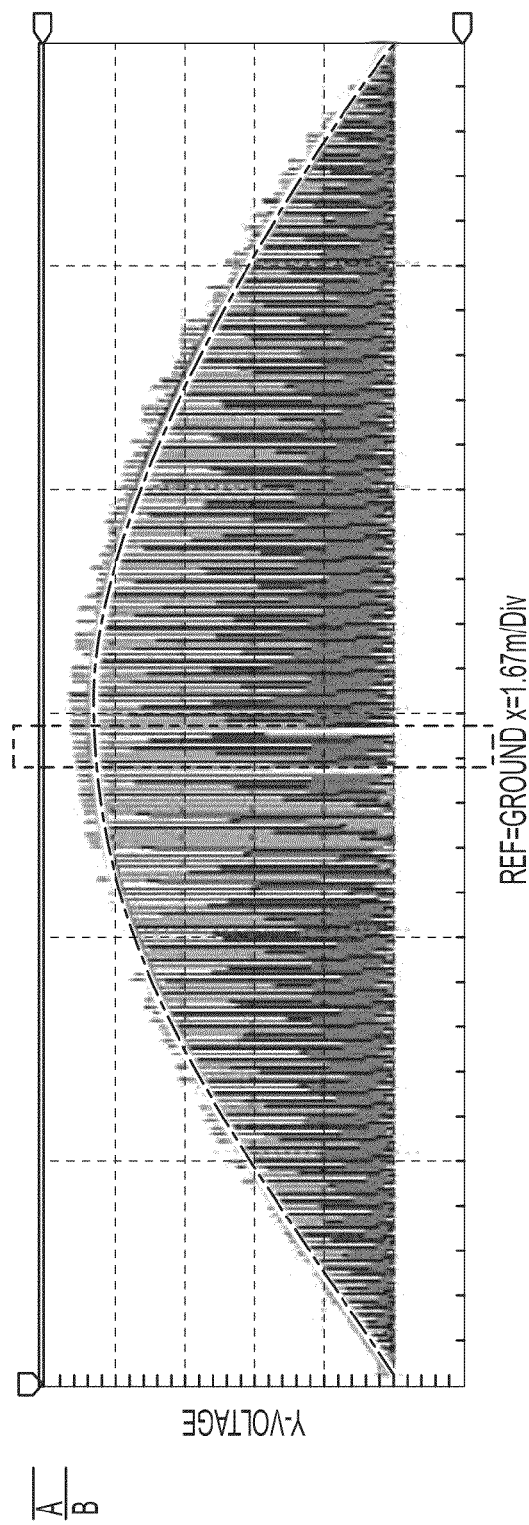
FIG. 13 is a waveform diagram illustrating a motor current and a capacitor discharging current in a motor driving circuit according to an embodiment of the present invention.

FIG. 10 is a waveform diagram illustrating a phase of a motor current and an output of the first operational amplifier OPAMP1 in a circuit according to an embodiment of the present invention, and FIG. 11 is a waveform diagram illustrating a motor current and a charging current of the capacitor C in a circuit according to an embodiment of the present invention. FIG. 12 is a waveform diagram that a portion of the waveform diagram of FIG. 11 is enlarged, FIG. 13 is a waveform diagram illustrating an output of the second operational amplifier OPAMP2 in a circuit according to an embodiment of the present invention, and FIG. 14 is a waveform diagram that a portion of the waveform diagram of FIG. 13 is enlarged.

Referring to FIGS. 10 to 14, when charging energy of the capacitor C is increased in proportion to an off state delay time of a switch, a distortion ratio of the waveform of the motor current is also increased. When an output of the first or second comparator Comp1 or Comp2 becomes 0 (OFF) from 1 (ON), energy efficiency may be increased by adjusting an OFF state delay time as follows in order to maintain a continuous mode of the motor current through En1 or En2 after memorizing an On state delay time.

When Vc is assumed to be constant,
since $\Delta I\_on + \Delta I\_off > 0$ and
$\Delta I\_on = (D \times Vs)/L$, $\Delta I\_off = (Vs−Vc) \times (1−D)/L$ in an increase period (0° to 90°) of the current waveform, $$1−D < Vs/Vc.$$

Accordingly, as the current waveform is closer to 90°, Vs/Vc increases and a maximum value of an OFF duty cycle increases.

On the contrary, since $\Delta I\_on + \Delta I\_off < 0$ in a decrease period (90° to 180°) of the current waveform, the maximum value of the OFF duty cycle decreases.

Here, $\Delta I\_on$ is a motor current change while the first or second switching element S1 or S2 is turned on, $\Delta I\_off$ is a motor current change while the first or second switching element S1 or S2 is turned off, D is an ON duty cycle, and (1−D) is an OFF duty cycle.

When charging the capacitor, an ON or OFF period are affected by dynamic resistance, motor coil impedance, a magnitude of the applied voltage and a current setting. Accordingly, energy saving effect is variable according to the above-described motor characteristics and control method.

For a speed control below a motor rated speed, resistors R1 and R2 are represented as variable resistors in the present invention. When input voltages to the (+) terminals of the first and second comparators Comp1 and Comp2 decrease according to decrease of resistance, output signals of the first and second operational amplifiers OPAMP1 and OPAMP2 decrease. When the motor current is also linearly decreased, an output and a rotation speed of the motor 20 decrease.

A power saving driving circuit including power factor correction for a motor according to an embodiment of the present invention can lower a cost and save energy by implementing a simple but efficient motor control circuit by using current maintaining characteristics of a motor coil. That is, a power saving driving circuit for a motor including power factor correction according to an embodiment of the present invention can, first, reduce a cost and limit switch on losses by replacing an inductor used for storing energy with a motor coil. Second, the motor driving circuit can have a power factor of about 1 by detecting applied voltage waveform through a simple resistance-dividing circuit and using the detected applied voltage waveform as a reference voltage for applying a sine wave current to the motor, and configure a speed control circuit due to current reduction. Third, the motor driving circuit can save energy by discharging a voltage charged in a capacitor for power factor correction through a feedback circuit.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A power saving driving circuit for a motor including power factor correction, comprising:
   an induction motor;
   a power factor correction capacitor;
   a first switching element allowing the motor to operate in a positive sine wave period of an power supply voltage;
   a diode allowing the power factor correction capacitor to be charged during the first switching element being OFF;
   a second switching element allowing the motor to operate in a negative sine wave period of the power supply voltage;
   another diode allowing the power factor capacitor to be charged during the second switching element being OFF;
   a third switching element connected in parallel to the diode and allowing the motor to operate in a power saving mode with a discharge current of the power factor correction capacitor in the positive period of the power supply voltage;
   a fourth switching element connected in parallel to the other diode and allowing the motor to be operate in a power saving mode with a discharge current of the power factor correction capacitor in the negative period of the power supply voltage; and
   a controller controlling the motor to save power by controlling the third and fourth switching elements when a charged voltage in the power factor correction capacitor reaches a predetermined set value while the motor is normally operated by controlling the first and second switching elements.

2. The driving circuit of claim 1, using a motor coil as a power factor correcting inductor during a normal operation charging a power factor correction capacitor with a flyback voltage accumulated in a coil of the motor, and using the power factor capacitor voltage as a motor applied voltage during a power saving operation discharging the power factor correction capacitor through a feedback circuit.

3. The driving circuit of claim 1, wherein capacitor charging efficiency and energy saving effect are variable according to an ON/OFF period of each of the first to fourth switching elements, first and second variable resistors, and impedance of the motor coil.

4. The driving circuit of claim 1, wherein the controller comprises:
- a microcomputer receiving a phase detecting signal of the power supply voltage and a detecting signal of the charged voltage and outputting enable signals for turning on the first to fourth switching elements;
- a normal operation detecting resistor allowing an operation current of the motor to be detected during a normal operation;
- a power saving operation detecting resistor allowing an operation current of the motor to be detected during a power saving operation;
- a first operational amplifier amplifying a detection voltage across the normal operation detecting resistor;
- a second operational amplifier amplifying a detection voltage across the power saving operation detecting resistor;
- a multiplexer selecting an output of the first or second operational amplifier according to a selection signal;
- a first switching element controller comparing an output of the multiplexer with a divided input voltage sine wave to output a control signal for turning on/off the first switching element;
- a second switching element controller comparing an output of the multiplexer with a divided input voltage sine wave to output a control signal for turning on/off the second switching element;
- a third switching element controller comparing a divided capacitor voltage with a divided input voltage peak in the power saving operation to output a control signal for turning on/off the third switching element; and
- a fourth switching element controller comparing a divided capacitor voltage with a divided input voltage peak in the power saving operation to output a control signal for turning on/off the fourth switching element.

5. The driving circuit of claim 4, using a motor coil as a power factor correcting inductor during a normal operation charging a power factor correction capacitor with a flyback voltage accumulated in a coil of the motor, and using the power factor capacitor voltage as a motor applied voltage during a power saving operation discharging the power factor correction capacitor through a feedback circuit.

6. The driving circuit of claim 4, wherein capacitor charging efficiency and energy saving effect are variable according to an ON/OFF period of each of the first to fourth switching elements, first and second variable resistors, and impedance of the motor coil.

* * * * *